United States Patent [19]
Taplin

[11] 4,190,029
[45] Feb. 26, 1980

[54] CONTROL OF EGR IN A CLOSED LOOP EFI ENGINE

[75] Inventor: Lael B. Taplin, Bloomfield Hills, Mich.

[73] Assignee: The Bendix Corporation, Southfield, Mich.

[21] Appl. No.: 955,851

[22] Filed: Oct. 30, 1978

Related U.S. Application Data

[62] Division of Ser. No. 826,002, Aug. 19, 1977.

[51] Int. Cl.$^2$ .............................................. F02M 7/00
[52] U.S. Cl. .............................................. 123/119 A
[58] Field of Search ....... 123/119 A, 32 EE, 119 EC, 123/32 CA

[56] References Cited
U.S. PATENT DOCUMENTS

| | | | |
|---|---|---|---|
| 3,788,284 | 1/1974 | Gardner | 123/119 A |
| 3,872,846 | 3/1975 | Taplin | 123/119 A |

*Primary Examiner*—Ronald B. Cox
*Attorney, Agent, or Firm*—Bruce L. Lamb; Russel C. Wells

[57] ABSTRACT

System for controlling exhaust gas recirculation in an internal combustion engine having fuel supply means controlled by an electronic control unit. A sensor determines whether the air/fuel mixture of exhaust gases is above or below stoichiometric conditions to generate a feedback signal for the electronic control unit so as tend towards said stoichiometric conditions. Exhaust gas recirculation is controlled by an EGR valve responsive to a command signal. The command signal is equal to the sum of a first signal substantially equal to the control signal generated by an EGR program voltage plus a correction signal, and of a second square wave signal having a given frequency. The correction signal is a function of the amplitude of the frequency component of said feedback, having said given frequency.

11 Claims, 1 Drawing Figure

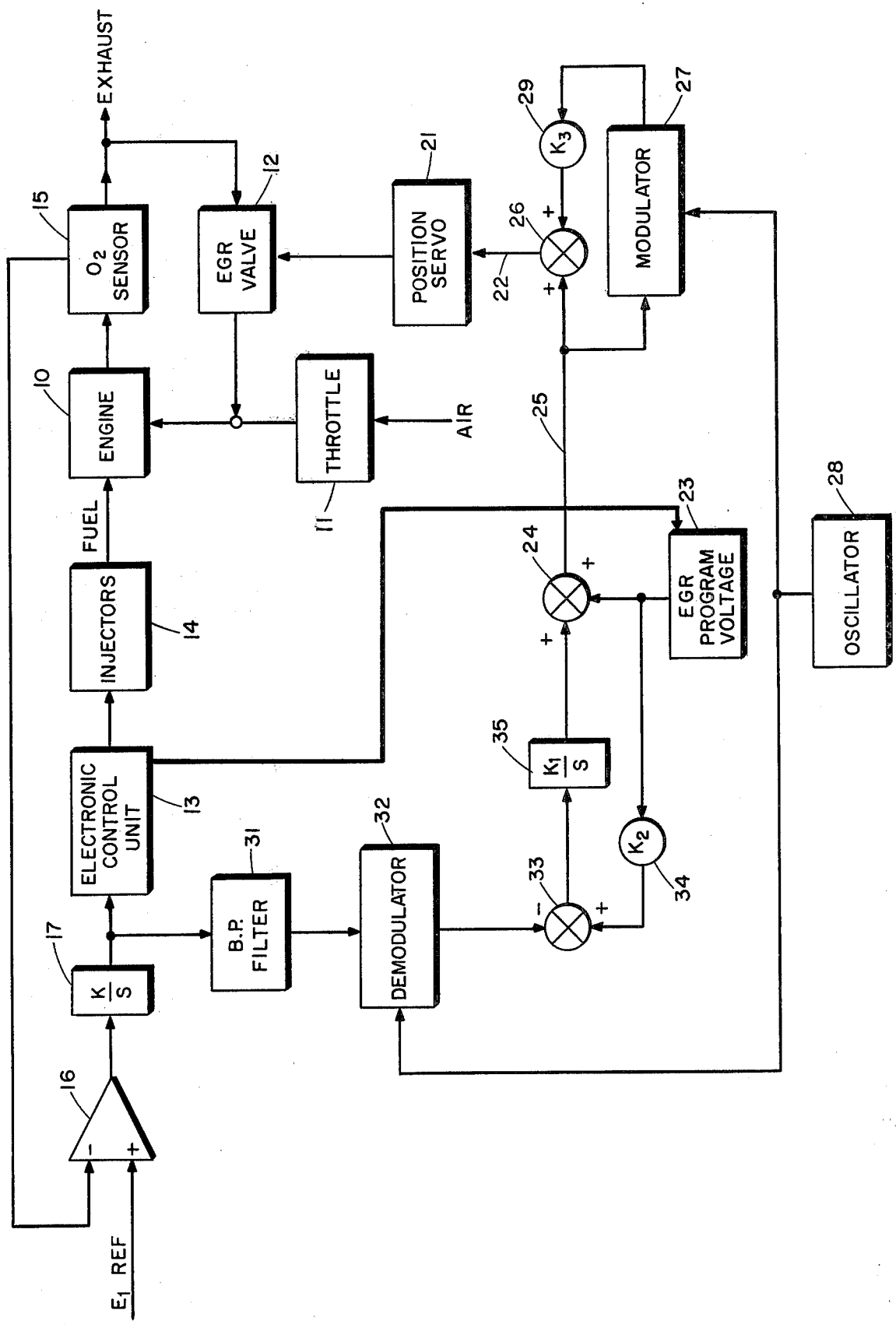

CONTROL OF EGR IN A CLOSED LOOP EFI ENGINE

This is a division of application Ser. No. 826,002 filed Aug. 19, 1977.

The present invention relates to exhaust gas recirculation systems for internal combustion engines. More particularly, it relates to an exhaust gas recirculation control system which includes means for determining the effect of the addition of a certain amount of exhaust gases to the combustion charge of an internal combustion engine and for controlling the amount of added exhaust to maintain a desired exhaust gas composition.

The inclusion of a certain amount of recirculated exhaust gases in the combustion charge of an internal combustion engine is recognized as one means of limiting peak combustion temperature and hence the production of noxious nitrogen-oxygen compounds (NOx) released to the atmosphere along with other products of combustion. However, a penalty is paid for this form of control of combustion products in the form of a loss in engine efficiency. Substantial effort has therefore been devoted to the determination of the correct proportions of air, fuel and exhaust gas making up the combustion charge which will result in the production of an acceptable level of pollutants while still maintaining tolerable efficiency and operability under a variety of load conditions.

Closed loop electronic fuel injection (EFI) represents the nearest realization to date of a combustion control system for spark ignition engines affording optimum performance and fuel economy without generating unacceptable levels of pollutant emissions.

In its simplest, ideal form, such a system comprises a command unit which sets the required a/f mixture according to the immediate load demands and operating environment of the engine and an a/f ratio sensor which provides a signal indicative of the mixture actually achieved. The sensor signal is compared with the command signal and, in conventional negative feedback fashion, adjustment is made in the a/f proportioning device until the actual mixture equals the command mixture.

For such an idealized system, U.S. Pat. No. 3,963,011, issued June 15, 1976, proposes to control the a/f mixture by comparing the actual a/f ratio with the desired a/f ratio and adjusting the amount of exhaust gas recirculated until the actual a/f ratio equals the desired a/f ratio. However, this proposal assumes the existence of a sensor capable of directly linearly indicating the actual a/f ratio through the range of interest and assumes that departure of the actual a/f ratio from the desired a/f ratio is solely the result of misadjustment in the amount of exhaust gas recirculated. Neither of these assumptions conform to reality.

In a practical system an oxygen sensor exposed to the engine exhaust senses the stoichiometric point and signals the same by abruptly switching from a relatively high voltage output (approximately 1 v.) prevailing under rich mixture conditions to a relative low voltage output ($<0.1$ v.) prevailing under lean mixture conditions. The preferred air/fuel mixture ratio is not fixed but varies between $\pm 2$-3% a/f:a/f (stoichiometric) according to the load demands and other operating parameters of the engine. Since the oxygen sensor reliably provides only an indication of the stoichiometric point, not the value of the a/f ratio, it is necessary to manipulate the sensor output signal in the feedback control system in order to achieve smooth control through the regime of mixture ratios prescribed for operation.

A closed loop system using an oxygen sensor is described in a paper entitled "Closed-Loop Electronic Fuel and Air Control of Internal Combustion Engines" by J. Camp and T. Rachel, published 1975, No. 750369 by Society of Automotive Engineers, Inc., Two Pennsylvania Plaza, New York, N.Y. 10001.

In this system the output of an oxygen sensor exposed to the engine exhaust is compared with a reference voltage in a limiting type comparator and the integrated output of the comparator serves as the feedback signal. The a/f ratio enters a limit cycle oscillation, the average value of which is the desired a/f ratio. Variation in the quantity of exhaust gas recirculated, of course, affects the a/f ratio and consideration has been given to using the a/f ratio error, determined as described by Camp et al, for controlling the setting of an EGR valve. However, such a system is subject to the deficiency noted with respect to U.S. Pat. No. 3,963,011. Namely, that factors in addition to the amount of exhaust gas recirculated affect the a/f ratio and it cannot be determined from measurement of a/f ratio alone which factor is responsible for an incorrect a/f ratio.

Accordingly, it is the principal object of the present invention to provide a means for identifying the effect of variation of a particular independent variable upon a function of several independent variables.

It is a further object of the invention to provide means for controlling a particular independent variable in a function of several independent variables. A more particular object of the invention is to provide means for controlling the proportion of exhaust gas to fuel and air making up the combustion charge of an internal combustion engine.

Still another object of the invention is to control by feedback means the quantity of recirculated exhaust gas in the combustion charge of an internal combustion engine.

These and other objects will become evident as an understanding of the invention is gained through study of the following description and its accompanying drawing.

Briefly, the invention involves, in an internal combustion engine with closed loop electronic fuel and air control, modulating the position command of an EGR valve with a frequency which is relatively high in comparison with the frequency of the limit cycle oscillation of the a/f ratio. The relatively high frequency signal component thereby caused to appear in the feedback signal from the exhaust gas sensor is separated from the feedback signal and phase detected. The level of the detector output signal is compared with a level of the EGR position command corresponding to the level of modulation and any error therebetween is used in negative feedback fashion to correct the EGR valve position command.

The single FIGURE of the drawing is a functional block diagram of the closed loop EGR control of the invention.

Referring to the drawing, an internal combustion engine 10 receives a combustion charge comprising a quantity of air the amount of which is determined by the position of a throttle 11; a quantity of exhaust gas, determined by the position of an EGR valve 12; and a quantity of fuel, determined by an electronic control unit 13.

As is known in the art, various sensors (not shown) furnish the electronic control unit with information on engine speed, temperature, manifold pressure, and the like from which the electronic control unit determines the quantity of fuel necessary to make up a charge of the a/f ratio desired under the prevailing conditions. The electronic control unit meters an appropriate amount of fuel into the engine by controlling the open dwell time of fuel injectors 14. An oxygen sensor 15 located in the engine exhaust stream provides an electrical output which is relatively high in the absence of oxygen and relatively low in the presence of oxygen. If the mixture is rich all available oxygen in the combustion charge will be consumed resulting in a high output from sensor 15 and, vice versa, oxygen will remain after all fuel has been consumed in a lean mixture, resulting in a low output from sensor 15.

The output of sensor 15 is compared with a reference voltage in a limiting type comparator 16. Output of comparator 16 is of square wave form switching between two constant voltage levels as the sensor 15 responds to changes between rich and lean mixtures. The output of comparator 16 is integrated at 17 and applied to the electronic control unit 13 as a feedback signal. In the electronic control unit the feedback signal is compared with the signal representing the scheduled a/f ratio and adjustment is made in the injector control to minimize the difference therebetween. When the loop is closed in this manner the output of integrator 17 is a triangular wave having an average value, ideally, corresponding to the desired a/f ratio.

In the foregoing system of the prior art, more completely described in the above referenced paper by Camp and Rachel, the quantity of exhaust gas recirculated is controlled by setting the EGR valve 12 to deliver either a fixed percentage of a quantity of air in the combustion charge or in accordance with a schedule determined by the electronic control unit 13. It can be seen that the a/f ratio may not be controlled properly since the sensor 15 cannot distinguish between incorrect amounts of fuel and incorrect amounts of exhaust gas in the combustion charge. The elements of the invention next to be described correct this deficiency.

The quantity of exhaust gas in the combustion charge is determined by the setting of valve 12 and the setting of the valve is controlled by the position servo 21 which may be any of the known electro-mechanical, electro-pneumatic, or electro-hydraulic types. Servo 21 provides a displacement output for positioning valve 12 which is proportional to the command voltage on line 22. According to the prior art such a command voltage would be applied directly from an EGR program voltage source 23. The output of source 23 is generally a voltage which varies with the engine operating conditions as determined by the electronic control unit 13. In accordance with the invention, however, the EGR program voltage from source 23 is applied first to a summing junction 24 and thence by line 25 to a summing junction 26. The voltage on line 25, which is not solely the output of source 23 as will later be seen, is also applied as the input signal to the modulator 27. Modulator 27 is preferably of the chopper type and is driven by an oscillator 28. The frequency of oscillator 28 is preferably in the range of 3–10 Hz which will be distinct from the frequency of the triangular wave present at the output of integrator 17. The output of modulator 27 is then a square wave having an amplitude equal to the voltage on line 25 and a frequency equal to that of oscillator 28. The amplitude of the modulator output wave is adjusted by a voltage divider 29 to be a small percentage, suitably 10%, of the voltage on line 25 and is added thereto in summer 26. Thus the input to position servo 21 on line 22 is a low amplitude square wave which is biased in amount equal to the EGR program voltage from source 23.

The relatively high frequency oscillation introduced in the a/f ratio will be detected by sensor 15 and appear at the output of integrator 17 as a triangular wave having the frequency of oscillator 28. This higher frequency component is separated from the output of integrator 17 by a band pass filter 31 which is centered on the frequency of oscillator 28. The output of filter 31 is synchronously demodulated in demodulator 32 which provides a unipolar output voltage having a negative polarity and a magnitude related to the amplitude of the output of filter 31.

Demodulator 32 may suitably be a chopper type driven by the output of oscillator 28. In such case, the phase of the oscillator drive for the demodulator may be adjusted to compensate for phase shift occurring in the output signal of modulator 27 during passage from servo 21 to the output of filter 31. Alternatively, demodulator 32 may comprise two chopper stages driven in quadrature by oscillator 28. The outputs of the chopper stages are then squared and summed to provide the demodulator output.

The output of demodulator 32 is applied to the negative input of a summing junction 33. The second input to junction 33, applied to the positive input, is supplied by a voltage divider 34 which receives as input the EGR program voltage from source 23. Voltage dividers 29 and 34 are calibrated relative to each other so that the output of summer 33 is zero when the quantity of exhaust gas furnished to the engine is equal to the amount required by the EGR program. The variation between the amount of exhaust gas delivered to the engine and the amount required by the EGR program results in the appearance of an error signal at the output of summer 33. This error is integrated by an integrator 35 and then applied as the second input to summing junction 24. Consequently if the amount of exhaust gas delivered to the engine should be less than the required amount the command voltage on line 25 will increase, further opening valve 12 until the correct amount of exhaust gas is delivered. Conversely, if an excess amount of exhaust gas is delivered the voltage on line 25 is reduced, closing valve 12 until the correct amount of exhaust gas is furnished to the engine.

Although the embodiment of the invention set forth is specifically directed to the control of the amount of exhaust gas in the combustion charge for an internal combustion engine, obviously the principles of the invention can be applied to control the quantities of fuel and air therein as well.

The invention claimed is:

1. In an internal combustion engine having sensor means exposed to exhaust gases from the engine providing a feedback signal, means for controlling the quantity of exhaust gas recirculated from the exhaust of the engine to form a part of the combustion charge therefore, said control means comprising:

an adjustable valve for metering exhaust gas from the exhaust of the engine to the combustion chamber thereof;

program voltage source means for generating a plurality of electrical signals each indicating the desired exhaust gas recirculation;

adjusting means for adjusting said valve in accordance with one of said signals for said program voltage source means;

means for imposing an oscillation upon the adjustment provided by said adjusting means, said oscillation having a predetermined frequency and an amplitude constituting a fixed percentage of said adjustment;

means for detecting oscillation in the output of the sensor means occurring at said predetermined frequency of oscillation imposed upon said adjustment, the level of the output of said detecting means being proportional to the amplitude of said predetermined frequency oscillation in the sensor output;

means for comparing the output level of said detecting means with said signals from said program voltage source means to determine the relationship of said output level with the amplitude of said oscillation imposed upon said adjustment; and means responsive to said comparing means for modifying the adjustment of said adjusting means until the output of said detecting means bears a fixed relationship to the amplitude of said oscillation imposed upon said adjustment.

2. An exhaust gas recirculation control as claimed in claim 1, wherein said adjusting means comprises a position servo providing an output valve position in response to an electrical input signal.

3. An exhaust gas recirculation control as claimed in claim 2 wherein said means for imposing an oscillation upon the adjustment provided by said adjusting means comprises, means providing an electrical oscillation having a predetermined frequency and an amplitude which is a fixed percentage of the magnitude of signal from said program voltage source; and means for combining said signal from said program voltage source and said electrical oscillation as said input signal to said position servo.

4. An exhaust gas recirculation control as claimed in claim 3 wherein said means for detecting oscillation in the output of the sensor comprises a synchronous type detector receiving a reference signal from said means providing an electrical oscillation.

5. An exhaust gas recirculation control as claimed in claim 3 wherein said comparing means includes means providing a proportional part of said signal from said program voltage source;

means providing an error signal equal to the difference between said detector output and said proportional part of signal from said program voltage source; and means for adding said error signal to said signal from said program voltage source prior to application of said signal from said source to said combining means.

6. An exhaust gas recirculation control as claimed in claim 5 wherein said comparing means additionally includes an integrator for integrating said error signal prior to applying said error signal to said adding means.

7. In an internal combustion engine having an electronic closed loop fuel control system including a sensor for determining the presence or absence of oxygen in the exhaust gases of the engine, an exhaust gas recirculation control, comprising a valve for controlling the flow of exhaust gas to the engine combustion chamber;

a servo responsive to a position signal for adjusting said valve to set the quantity of exhaust gas entering the engine combustion chamber;

means providing a program signal representing a desired adjustment of said valve;

modulating means providing a position signal for said servo which is a composite of said program signal and an oscillatory signal having a predetermined frequency and amplitude which is a fixed percentage of said program signal;

synchronous detector means receiving an input from the exhaust gas oxygen sensor and a reference signal from said modulating means and providing an output related to the amplitude of oscillations at said predetermined frequency occurring in the output of said sensor;

means providing the difference between the output of said detector means and a predetermined percentage of said program signal; and means for adding said difference to said program signal in such sense as to cause said difference to be minimized.

8. A control as claimed in claim 7 wherein said detector means includes a bandpass filter for passing a frequency band of signals centered on said predetermined frequency.

9. A control as claimed in claim 7 wherein said modulating means comprises an oscillator operating at said predetermined frequency, a switching-type modulator driven by said oscillator for converting said program signal into a square wave having the frequency of said oscillator;

means for adjusting the amplitude of said square wave to a fixed percentage of the magnitude of said program signal; and means for adding said adjusted amplitude square wave to said program signal.

10. A control as claimed in claim 8 wherein said detector means is of the chopper type and said reference signal is furnished by said oscillator in constant phase relationship with the drive of said modulator.

11. A method for controlling the proportions of exhaust gas in the combustion charge for an internal combustion engine comprising the steps of:

metering the flow of exhaust gas from the exhaust system of the engine to the combustion charge in the input system of the engine;

adjusting the metered flow of exhaust gas according to a predetermined program value;

varying said adjustment in an oscillatory manner with a predetermined frequency and an amplitude having an amount which is a fixed percentage of the predetermined program value;

sensing the changes in the air/fuel ratio in the exhaust gas;

detecting the oscillatory amplitudes in the sensed change in the exhaust gas and providing an output in response thereto;

determining the relationship between the detected output amplitude and the varying amplitude and then readjusting the metered flow to minimize said relationship.

* * * * *